PROCESS FOR COLORING ORGANIC SOLVENTS, MINERAL OIL PRODUCTS, WAXES, PLASTICS AND SURFACE COATINGS WITH CYANO-NITRO-AMINO-AZO DYES

The invention relates to a process for colouring organic solvents, mineral oil products, waxes, plastics and surface coatings, which is characterised in that dyestuffs of the general formula I

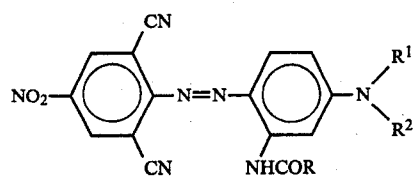

are used, in which R denotes alkyl having 1 to 7 C atoms and $R^1$ and $R^2$ independently of one another denote alkyl having 1 to 8 C atoms or alkenyl having 3 or 4 C atoms and $R^2$ additionally denotes hydrogen.

Examples of alkyl radicals represented by $R^1$ and $R^2$ are methyl, ethyl, n-propyl, isopropyl, n-butyl, isobutyl, sec.-butyl, n-pentyl, 2- and 3-methylbutyl, n-hexyl, n-heptyl and 2-ethylhexyl.

Alkenyl radicals represented by $R^1$ and $R^2$ are allyl, crotyl and methallyl.

Preferred radicals for $R^1$ and $R^2$ are ethyl, n-propyl, n-butyl, isobutyl and allyl.

Examples of alkyl radicals represented by R are methyl, ethyl, n-propyl, isopropyl, n-butyl, isobutyl, sec.-butyl, tert.-butyl, n-phentyl, pent-3-yl, n-hexyl and hept-3-yl.

Preferred radicals for R have 3 to 7 C atoms, such as, for example, n-propyl, isopropyl, n-butyl, isobutyl, sec.-butyl pent-3-yl or hept-3-yl. Particularly preferred alkyl radicals for R have 3 C atoms, in particular n-propyl.

Preferred dyestuffs for the process according to the invention have the formula I in which $R^2$ has the same meaning as $R^1$. In particular those dyestuffs of the formula I are preferred in which $R^1$ is identical to $R^2$ and denotes ethyl, n-propyl, n-butyl, isobutyl or allyl and R has the abovementioned ideally preferred meanings.

Preferred dyestuffs of the formula I are also those in which R denotes methyl or ethyl and the total number of carbon atoms in the 3 radicals R, $R^1$ and $R^2$ is at least 7, that is to say equal to 7 or larger than 7. Particularly preferred are dyestuffs of this type in which additionally $R^1$ is identical to $R^2$. Preferred dyestuffs of the formula I are also those in which $R^1$ denotes isopropyl or secondary alkyl having 4 to 8 C atoms and $R^2$ denotes hydrogen and the total number of carbon atoms in the radicals $R^1$ and $R^2$ is at least 7. Very particularly preferred is the dyestuff of the formula I in which R=n-propyl and $R^1=R^2=$ ethyl.

The dyestuffs of the general formula I can be prepared in a manner which is in itself known by diazotising an amine of the formula II:

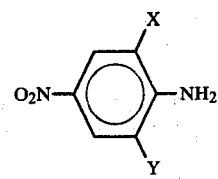

in which X represents cyano or halogen and Y represents halogen and halogen can be chlorine, bromine or iodine, coupling the resulting diazo compound with an amine of the formula III:

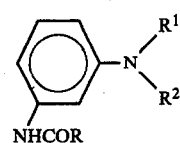

and replacing X and/or Y, insofar as it represents halogen, in the resulting compound of the general formula IV:

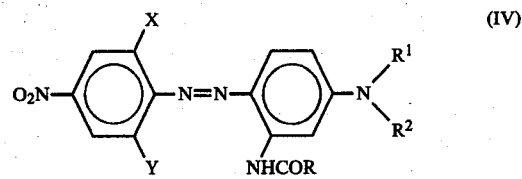

by cyano, as described, for example in the following German Offenlegungsschriften Nos. 1,544,563, 2,310,745, 2,456,495, 2,610,675, 2,724,116, 2,724,117, 2,834,137, 2,834,386, 2,846,438, 2,915,072 and 2,931,081.

Furthermore, the dyestuffs to be used according to the invention can also be prepared in line with the teaching of Czech Pat. No. 164,657 by diazotising the amine of the formula V:

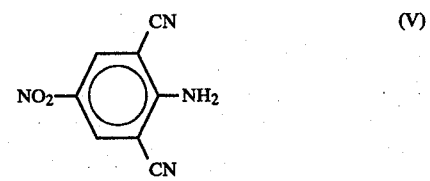

and coupling the diazo compound to an amine of the formula III, and advantageously freeing the dyestuff thus obtained from byproducts by crystallisation.

Some of the dyestuffs of the general formula I are known as disperse dyestuffs, in particular for dyeing polyester fibres, and are described, for example, in German Offenlegungsschrift No. 1,963,735 and in German Offenlegungsschrift No. 2,928,432.

It has now been found, surprisingly, that these dyestuffs are highly suitable for colouring organic solvents, mineral oil products, waxes, plastics and surface coatings since they have an unexpectedly high solubility, high colour intensity and good fastness properties, in particular good light-fastness, in these media.

Examples of organic solvents which can be coloured by means of dyestuffs of the formula I are alcohols, such as, for example, ethanol, propanol, isopropanol, butanol, isobutanol or tert.-butanol, esters, such as, for ex-

United States Patent [19]

Bühler et al.

[11] 4,430,090

[45] Feb. 7, 1984

[54] PROCESS FOR COLORING ORGANIC SOLVENTS, MINERAL OIL PRODUCTS, WAXES, PLASTICS AND SURFACE COATINGS WITH CYANO-NITRO-AMINO-AZO DYES

[75] Inventors: Ulrich Bühler, Schöneck; Reinhard Hähnle, Königstein; Joachim Ribka, Offenbach; Helmut Richter, Kahl, all of Fed. Rep. of Germany

[73] Assignee: Cassella Aktiengesellschaft, Frankfurt am Main, Fed. Rep. of Germany

[21] Appl. No.: 409,585

[22] Filed: Aug. 19, 1982

[30] Foreign Application Priority Data

Aug. 27, 1981 [DE] Fed. Rep. of Germany ....... 3133926

[51] Int. Cl.³ .................. C09B 29/08; C10L 1/22; C08K 5/23
[52] U.S. Cl. .................................. 8/508; 8/510; 8/513; 8/514; 8/521; 8/928; 8/938; 8/639
[58] Field of Search .................. 8/508, 514, 521, 510, 8/513

[56] References Cited

FOREIGN PATENT DOCUMENTS 3009635 9/1981 Fed. Rep. of Germany .
1279529 6/1972 United Kingdom .
2031451 4/1980 United Kingdom .

Primary Examiner—A. Lionel Clingman
Attorney, Agent, or Firm—Connolly and Hutz

[57] ABSTRACT

Dyestuffs of the formula

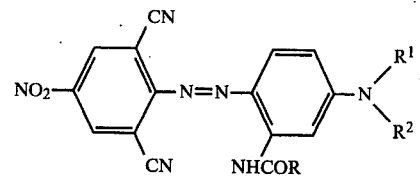

are used for coloring organic solvents, mineral oil products, waxes, plastics and surface coatings, wherein R is alkyl having 1 to 7 carbon atoms, $R^1$ is alkyl having 1 to 8 carbon atoms or alkenyl having 3 or 4 carbon atoms, and $R^2$ is hydrogen, alkyl having 1 to 8 carbon atoms or alkenyl having 3 or 4 carbon atoms.

13 Claims, No Drawings

$$\text{NO}_2-\underset{\underset{\text{CN}}{|}}{\overset{\overset{\text{CN}}{|}}{\bigcirc}}-N=N-\underset{\underset{\text{NHCOR}}{|}}{\bigcirc}-N\overset{R^1}{\underset{R^2}{\diagdown}}$$

| R | R$^1$ | R$^2$ | Hue |
|---|---|---|---|
| n-C$_4$H$_9$ | i-C$_3$H$_7$ | C$_2$H$_5$ | blue |
| n-C$_4$H$_9$ | CH(C$_2$H$_5$)$_2$ | H | reddish blue |
| CH(CH$_3$)$_3$ | C$_2$H$_5$ | C$_2$H$_5$ | reddish blue |
| CH(CH$_3$)$_3$ | n-C$_4$H$_9$ | n-C$_4$H$_9$ | reddish blue |
| CH$_2$CH(CH$_3$)$_2$ | C$_2$H$_5$ | C$_2$H$_5$ | blue |
| CH$_2$CH(CH$_3$)$_2$ | CH$_2$CH=CH$_2$ | CH$_2$CH=CH$_2$ | blue |
| CH$_2$CH(CH$_3$)$_2$ | CH(C$_2$H$_5$)C$_4$H$_9$ | H | reddish blue |
| CH(CH$_3$)C$_2$H$_5$ | CH$_3$ | CH$_3$ | blue |
| CH(CH$_3$)C$_2$H$_5$ | n-C$_3$H$_7$ | n-C$_3$H$_7$ | blue |
| CH(CH$_3$)C$_2$H$_5$ | n-C$_5$H$_{11}$ | n-C$_5$H$_{11}$ | blue |
| CH(CH$_3$)C$_2$H$_5$ | C$_2$H$_5$ | CH$_2$CH=CH$_2$ | blue |
| n-C$_5$H$_{11}$ | C$_2$H$_5$ | C$_2$H$_5$ | blue |
| n-C$_5$H$_{11}$ | CH$_2$CH=CH$_2$ | CH$_2$CH=CH$_2$ | blue |
| n-C$_5$H$_{11}$ | CH(CH$_3$)C$_2$H$_5$ | H | reddish blue |
| CH(C$_2$H$_5$)$_2$ | C$_2$H$_5$ | C$_2$H$_5$ | blue |
| CH(C$_2$H$_5$)$_2$ | n-C$_4$H$_9$ | n-C$_4$H$_9$ | blue |
| CH(C$_2$H$_5$)$_2$ | CH$_2$CH=CH$_2$ | CH$_2$CH=CH$_2$ | blue |
| CH(C$_2$H$_5$)$_2$ | i-C$_4$H$_9$ | C$_2$H$_5$ | blue |
| CH(C$_2$H$_5$)$_2$ | CH(CH$_3$)C$_2$H$_5$ | H | reddish blue |
| n-C$_6$H$_{13}$ | C$_2$H$_5$ | C$_2$H$_5$ | blue |
| CH(C$_2$H$_5$)C$_4$H$_9$ | C$_2$H$_5$ | C$_2$H$_5$ | blue |
| CH(C$_2$H$_5$)C$_4$H$_9$ | CH$_2$CH=CH$_2$ | CH$_2$CH=CH$_2$ | blue |
| CH(C$_2$H$_5$)C$_4$H$_9$ | CH$_2$CH(CH$_3$)=CH$_2$ | H | reddish blue |
| CH(C$_2$H$_5$)C$_4$H$_9$ | n-C$_4$H$_9$ | n-C$_4$H$_9$ | blue |
| CH(C$_2$H$_5$)C$_4$H$_9$ | | | |
| CH(C$_2$H$_5$)C$_4$H$_9$ | CH(C$_2$H$_5$)$_2$ | H | reddish blue |
| CH$_3$ | n-C$_4$H$_9$ | n-C$_4$H$_9$ | blue |
| CH$_3$ | n-C$_6$H$_{13}$ | n-C$_6$H$_{13}$ | blue |
| CH$_3$ | CH(C$_2$H$_5$)C$_4$H$_9$ | H | reddish blue |
| CH$_3$ | CH(C$_2$H$_5$)$_2$ | CH$_2$CH=CH$_2$ | reddish blue |

The organic solvents, mineral oil products, waxes, plastics and surface coatings are coloured with the dyestuffs of formula I by mixing these materials in liquid, molten or thermoplastic state, for example at temperatures from 0°–250° C., preferably from 10°–240° C., with one or several dyestuffs of formula I, the colouring of the substrate being effected, with rapid dissolution of the dyestuff or dyestuffs, within a period ranging from a few seconds to a few minutes. Substrates which are to be coloured and which are liquid at ambient temperature, such as organic solvents, mineral oil products (benzines, gasoline, petrol, diesel oils, fuel oils etc.), surface coatings (lacquers, varnishes, paints etc.) are mixed with the dyestuff of formula I at, as a rule, temperatures from 10°–30° C., preferably at ambient temperature. Waxes, in most cases, melt at temperatures from 50°–90° C. and are therefore, as a rule, mixed with the dyestuffs of formula I at these temperatures. In the case of liquid substrates the dyestuff or dyestuff mixture is, as a rule, mixed with the liquid or molten substrate by simple stirring in.

The colouring of plastics, in particular of polystyrene, can take place in various phases of their process of preparation, for example colouring the monomers prior to polymerisation, polycondensation or polyaddition. Normally however, thermoplastics are mixed and thus coloured in their thermoplastic state, for example on the roll mill, in the screw kneader, extruder or screw extruder, with the dystuff or dyestuff mixture at temperatures up to 250° C., preferably up to 240° C. During this operation, plasticizers, stabilizers, lubricants and/or other auxiliaries can be simultaneously incorporated into the plastics. Subsequently, the coloured plastics is granulated in a manner known by itself and is passed on to the final consumer. Thermoplastics can also be coloured by the final consumer using the so-called dry-colouring process. In this process, colourless plastic granules are mixed with the dyestuff or dyestuff mixture in a dry state and are subsequently processed in the injection moulding machine to give coloured injection moulded parts.

Depending on the depth of color desired, 0.001 to 10, preferably 0.002 to 5 parts by weight of the dyestuff or dyestuff mixture are employed per 1,000 parts by weight of substrate. In most cases it is appropriate not to mix the dyestuff or dyestuff mixture directly into the substrate to be coloured but to prepare first a so-called batch, i.e. a concentrated solution or pre-mixture and to subsequently mix said batch into the substrate to be coloured. The concentration of the dyestuff or dyestuff mixture in the batch is selected to be as high as possible and is, as a rule, 10 to 50 percent by weight, preferably 30 to 50 percent by weight. If the carrier substance used for the batch is an organic solvent, a mineral oil product which is liquid at ambient temperature or a different liquid product, the batch is prepared by stirring the dyestuff into the liquid product. If said carrier substance is a plastics the batch is coloured as described above in connection with the colouring of plastics, with the exception that the dyestuff concentration used for preparing the batch is selected to be correspondingly higher. It goes without saying that the organic solvents, mineral oil products, waxes, plastics and surface coatings to be coloured by the process of the invention can also contain further substances such as extenders or fillers, pigments, auxiliaries, stabilizers, resins and the like.

What is claimed is:

1. The process for coloring a material selected from benzine, gasoline, petrol, diesel oil, fuel oil, waxes, polyvinyl chloride, polyethylene, polypropylene, polystyrene, polymers of styrene-butadiene mixtures or acrylonitrile-butadiene mixtures, lacquers, varnishes or paints which comprises mixing said material in liquid, molten or thermoplastic state at temperatures from 0° to 250° C. with a color producing amount of a dyestuff of the formula

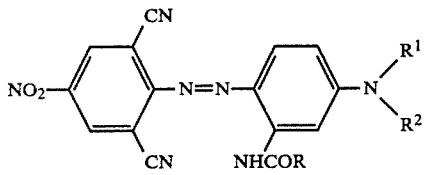

wherein R is alkyl having 1 to 7 carbon atoms; $R^1$ is alkyl having 1 to 8 carbon atoms or alkenyl having 3 or 4 carbon atoms; $R^2$ is hydrogen, alkyl having 1 to 8 carbon atoms or alkenyl having 3 or 4 carbon atoms.

2. The process according to claim 1 wherein said material to be colored is selected from waxes and is colored in molten state at temperatures of 50° to 90° C.

3. The process according to claim 1 wherein said material to be colored is selected from lacquers, varnishes or paints and is colored at temperatures of 10° to 30° C.

4. The process according to claim 1 wherein said material to be colored is polystyrene.

5. The process according to claim 1 wherein $R^1$ and $R^2$ are identical.

6. The process according to claim 1 or claim 2 wherein each of $R^1$ and $R^2$ is ethyl, n-propyl, n-butyl, isobutyl or allyl.

7. The process according to claim 1 wherein R is alkyl having 3 to 7 carbon atoms.

8. The process according to claim 7 wherein R is alkyl having 3 carbon atoms.

9. The process according to claim 8 wherein R is n-propyl.

10. The process according to claim 1 wherein each of $R^1$ and $R^2$ is ethyl and R is n-propyl.

11. The process according to claim 1 wherein the dyestuff comprises mixtures of two or more species of said formula with the proportion of the individual species in the mixture being 10 to 90 percent by weight.

12. The process according to claim 1 wherein R is methyl or ethyl and the total number of carbon atoms in R, $R^1$ and $R^2$ is at least 7.

13. The process according to claim 1 wherein $R^1$ is isopropyl or secondary alkyl having 4 to 8 carbon atoms, $R^2$ is hydrogen, and the total number of carbon atoms in $R^1$ and R is at least 7.

* * * * *